(12) United States Patent
Peinelt et al.

(10) Patent No.: US 11,813,901 B2
(45) Date of Patent: Nov. 14, 2023

(54) DEVICE FOR CLAMPING A RIM OF A VEHICLE WHEEL

(71) Applicant: Schenck RoTec GmbH, Darmstadt (DE)

(72) Inventors: Andreas Peinelt, Pfungstadt (DE); Mark Ortwein, Darmstadt (DE); Martin Rogalla, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 375 days.

(21) Appl. No.: 17/087,920

(22) Filed: Nov. 3, 2020

(65) Prior Publication Data

US 2021/0162822 A1  Jun. 3, 2021

(30) Foreign Application Priority Data

Nov. 28, 2019  (DE) ..................... 10 2019 132 287.1

(51) Int. Cl.
    *B60C 25/05*  (2006.01)
(52) U.S. Cl.
    CPC ...... *B60C 25/0536* (2013.01); *B60C 25/0503* (2013.01)
(58) Field of Classification Search
    CPC .. B60C 25/0539; B60C 1/2436; B25B 1/2436
    USPC ............................................. 157/16, 19, 20
    See application file for complete search history.

(56) References Cited

U.S. PATENT DOCUMENTS

| 1,793,863 | A | | 2/1931 | Manley |
| 4,070,915 | A | * | 1/1978 | Caroff .................. G01M 1/045 |
| | | | | 73/487 |
| 4,250,936 | A | | 2/1981 | Du Quesne |
| 5,130,589 | A | | 7/1992 | Kanemitsu |
| 6,039,104 | A | * | 3/2000 | Cunningham .......... B60C 25/00 |
| | | | | 269/88 |
| 7,201,203 | B2 | | 4/2007 | Rogalla et al. |
| 7,509,988 | B1 | | 3/2009 | Nemish |
| 9,254,722 | B2 | | 2/2016 | Gonzaga et al. |
| 2013/0139974 | A1 | * | 6/2013 | Gonzaga ............... B60C 25/138 |
| | | | | 29/401.1 |

FOREIGN PATENT DOCUMENTS

| BE | 840 808 A | | 8/1976 | |
| DE | 102 56 870 A1 | | 6/2004 | |
| EP | 2 599 649 A1 | | 6/2013 | |
| EP | 3 086 104 A1 | | 10/2016 | |
| EP | 3086104 A1 | * | 10/2016 | ............ B60B 30/06 |
| EP | 3446 816 A1 | | 2/2019 | |
| EP | 3 086 104 B1 | | 10/2020 | |
| FR | 2347217 A1 | * | 4/1977 | ............ B60C 25/06 |

* cited by examiner

*Primary Examiner* — Bryan R Muller
(74) *Attorney, Agent, or Firm* — Collard & Roe, P.C.

(57) ABSTRACT

In a device (1) for clamping a rim (2) of a vehicle wheel, at least four clamping elements (3) are provided which can be moved with respect to the rim (2) and comprise clamping arms (5) and support elements (7) having support surfaces (6). A rim flange of the rim (2) can be placed on the support surfaces. The clamping arms (5) are rotatably mounted, about their longitudinal axis, in the clamping elements (3), and have clamping fingers (8) at the end that protrude beyond the support surfaces (6), which fingers have clamping surfaces which can be brought into clamping contact with the placeable rim flange.

11 Claims, 4 Drawing Sheets

DEVICE FOR CLAMPING A RIM OF A VEHICLE WHEEL

CROSS REFERENCE TO RELATED APPLICATIONS

Applicants claim priority under 35 U.S.C. § 119 of German Patent Application No. 10 2019 132 287.1 filed Nov. 28, 2019.

FIELD OF THE INVENTION

The invention relates to a device for clamping a rim of a vehicle wheel, comprising four clamping elements which comprise support elements and clamping arms that are rotatable about their longitudinal axis and have clamping fingers that clamp the rim flange of the rim.

BACKGROUND OF THE INVENTION

In order to fit a tire on the rim of a vehicle wheel with the aid of a mounting machine, it is necessary to hold the vehicle wheel in position on the table of the mounting machine. The holding forces to be applied have to be large enough for the wheel to be held securely against the mounting forces that occur. The rim is clamped firmly by clamping jaws, the rim axis being substantially vertical. The tire is placed at an angle on the firmly clamped rim, part of its shoulder being held by a support at the level of the lower rim edge. A rotary tool first pulls the first lower tyro tire bead over the upper rim edge. The second tyro tire bead is then pulled over the upper rim edge by means of a rotary tool. During this process, the second tire bead has to slide into the drop center of the rim so that the second tire bead can be pressed over the upper rim edge without overstretching. For some rims, the drop center is approximately halfway up the rim, meaning that the tire has to be very highly deformed during this mounting step. Since the tire resting on the table cannot move out of the way, this deformation can damage the tire.

U.S. Pat. No. 6,039,104 A discloses a device having a flat plate on which pairs of opposing clamping jaws can be moved along two axes that intersect at right angles. The clamping jaws are L-shaped and can be fastened to movable carriers in two different positions, a different clamping claw being in the clamping position in each position. The clamping claws are located at a distance above the plate and have only short rest surfaces on which the rim to be clamped can be placed. The clamping claws therefore have to be moved close to the clamping diameter before clamping so that the rim can be placed down.

In a device known from U.S. Pat. No. 1,793,863 A, the clamping jaws each have two mutually facing clamping claws, one of which is designed to grip around an inner rim edge and the other to grip around an outer rim edge. Small rest surfaces are arranged on the clamping jaws, on which surfaces the rim can be placed before clamping. If the position of the clamping jaws deviates too much from the rim diameter, the rest surfaces are ineffective.

DE 102 56 870 A1 discloses a device for clamping the rim of a vehicle wheel, in particular for tire mounting, comprising a rest on which one side of the rim can rest. Clamping jaws for firmly clamping the rim edge that is adjacent to the rest are movable radially to the rim, two pairs of clamping jaws being provided on a carrier, the movement paths of which cross one another at right angles. The movement of the clamping jaws is generated by a lifting cylinder and is synchronized by a gear mechanism.

The disadvantage of the known clamping devices is that they are generally restricted in their movement and adjustment to the rim size is difficult. It is therefore often necessary to remount the clamping device when changing the rim. In addition, the use of an unsuitable clamping device often results in damage to the rim, since the rim is clamped using just a few clamping means that have to introduce correspondingly higher forces.

SUMMARY OF THE INVENTION

The aim of the invention is that of providing a movable clamping device by means of which rims can be clamped securely and without damage.

The aim is achieved according to the invention by providing a device for clamping a rim of a vehicle wheel, comprising at least four clamping elements which can be moved with respect to the rim and comprise clamping arms and support elements having support surfaces on which a rim flange of the rim can be placed, the clamping arms being rotatably mounted, about their longitudinal axis, in the clamping elements, and having clamping fingers at the end that protrude beyond the support surfaces, which fingers have clamping surfaces which can be brought into clamping contact with the placeable rim flange. Since the clamping arms are rotatable, the clamping device can be adjusted to the rim size. The clamping device securely clamps the rim at four points, such that the clamping forces are introduced evenly and the clamping fingers can be aligned on the rim flange. It has been found that rim diameters of 15 to 24 inches can be clamped by means of the clamping device. The device according to the invention is provided as a clamping device in particular for mounting disc wheels in a tire mounting station, in which clamping device the rim has to be clamped in order to allow the tire to be fitted.

In one embodiment, the support elements are rotatably mounted, about their longitudinal axis, in the clamping elements. In addition to the rotatability of the clamping arms, rotatability of the support elements may be advantageous. Alternatively, the support elements can be designed in such a way that they are cylindrical and have support surfaces for supporting the rim flange substantially on the entire top of said elements. In this way, depending on the position of the clamping arm, the rim flange can be supported. The top of the support elements can be coated with a friction-reducing layer.

In order to place the clamping surface tangentially on the rim flange, it may be advantageous for the clamping fingers to have a first vertical clamping region and a second clamping region which is adjacent thereto and forms the clamping surface, the second region being inclined with respect to the first region. When the clamping elements are moved towards the rim and the clamping arms turn in, the clamping surfaces hit the rim flange and transmit clamping forces into the rim flange. In one embodiment, the angle of inclination between the first clamping region and the second clamping region is more than 90°. This generates sufficient frictional torque and prevents damage to the rim.

The clamping arms or the support elements can preferably be moved vertically such that the distance between the clamping surface and the support surface can be changed. Due to the vertical movement in which either the clamping arms or the support elements are retracted or extended, the distance between the support surfaces and the clamping surfaces can be adapted to the rim flange size. For small rim diameters of which the rim flange does not come into contact with the clamping surfaces but with the first clamping regions when the clamping elements are turned in, the clamping arms or the support elements can be moved vertically such that the clamping surfaces are brought into contact with the rim flange and can introduce clamping force into said flange.

In a further embodiment, a lifting cylinder is provided in each case on the clamping element so as to be brought into operative contact with a clamping arm or a support element, and the clamping arm or a support element can be moved vertically by a downward and upward stroke of the lifting cylinder. The clamping arm or the support element can be moved vertically by a pneumatically or hydraulically actuable lifting cylinder, the piston rod of which is operatively connected to the clamping arm or to the support element. This generates sufficient force to move the rim flange vertically and clamp said flange in a planar manner.

In order to all the more prevent Hertzian contact pressures on the rim flange, the clamping surfaces of the clamping fingers, in particular the second clamping region, can be concave. However, it may also be advantageous to design both clamping regions of the clamping fingers to be concave. Alternatively, it may be advantageous for the first and/or the second clamping region of the clamping fingers to be flat.

The clamping elements can advantageously be moved in a plane that is substantially perpendicular to the longitudinal axis of the placeable rim. This allows the radial distance from the rim flange to be changed. In one embodiment, the clamping elements have shafts which penetrate said elements and are connected to a drive arranged below the clamping elements such that the clamping elements can be moved in a circular arc in a plane perpendicular to the longitudinal axis of a placeable rim. By moving the clamping elements towards the rim, the clamping surfaces can be brought into operative contact with the rim flange. The drive can be designed, for example, as a pneumatically or hydraulically actuable lifting cylinder. Alternatively, an electric drive can be used.

In order to synchronize the movement of the clamping elements and thus to ensure uniform placement of the clamping fingers and, above all, to prevent the rim from shifting out of a centered position by moving e.g. a clamping element, each two clamping elements arranged adjacently to one another can be connected via gear wheels so as to transmit movement, such that the two clamping elements can be moved synchronously. The gear wheels can, for example, engage the clamping elements, or the shafts which penetrate the clamping elements and can be connected to the drive, for conjoint rotation. A movement of a clamping element thus causes the synchronous movement of the adjacent clamping element, which is in operative contact via gear wheels.

Furthermore, the movement of the four clamping elements can be synchronized. The movement of two clamping elements operatively connected via gear wheels is preferably synchronized, via a coupling rod which acts on the shafts of the clamping elements and is connected to the drive, with that of the opposite clamping elements that are operatively connected via gear wheels. The coupling rod can be connected to the shafts of the clamping elements and to the drive via a lever such that the force of the drive can be transmitted into the shafts of the clamping elements via the lever and the coupling rod and results in a synchronous movement of the clamping elements. It may also be advantageous to use two drives instead of one drive, each drive moving two clamping elements that are in operative contact with one another via the gear wheel drive, the movement of the four clamping elements or the two drives nonetheless being synchronizable via the coupling rod described.

BRIEF DESCRIPTION OF THE DRAWING

The invention will be explained in more detail with reference to embodiments of the invention, which are illustrated in the drawings, in which.

DETAILED DESCRIPTION OF THE DRAWINGS

Figure 1:
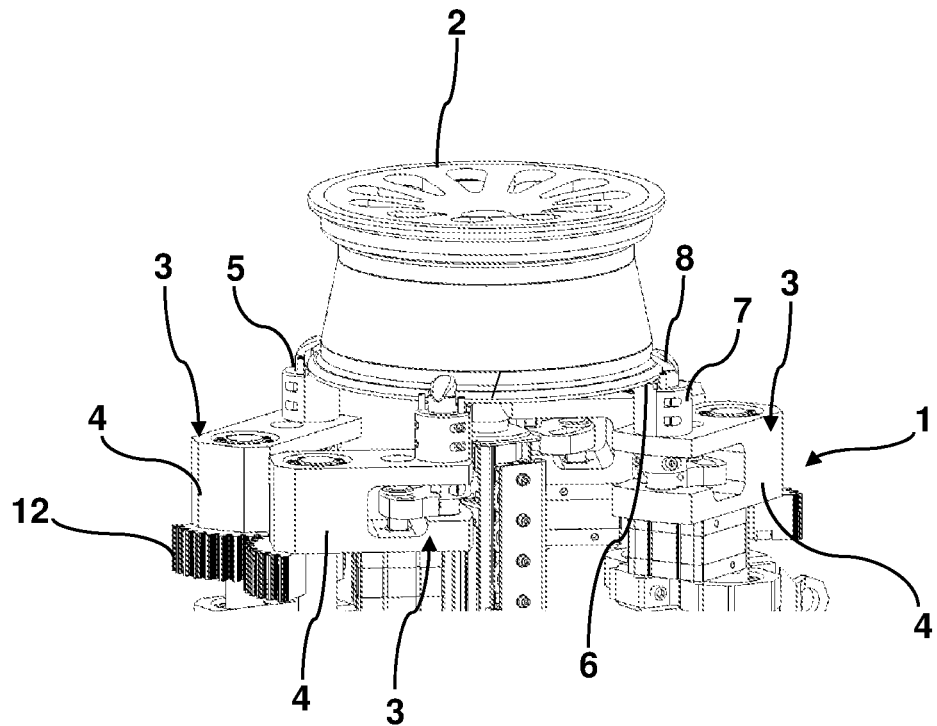
FIG. 1 is a perspective view of a clamping device together with a rim.
Figure 2:
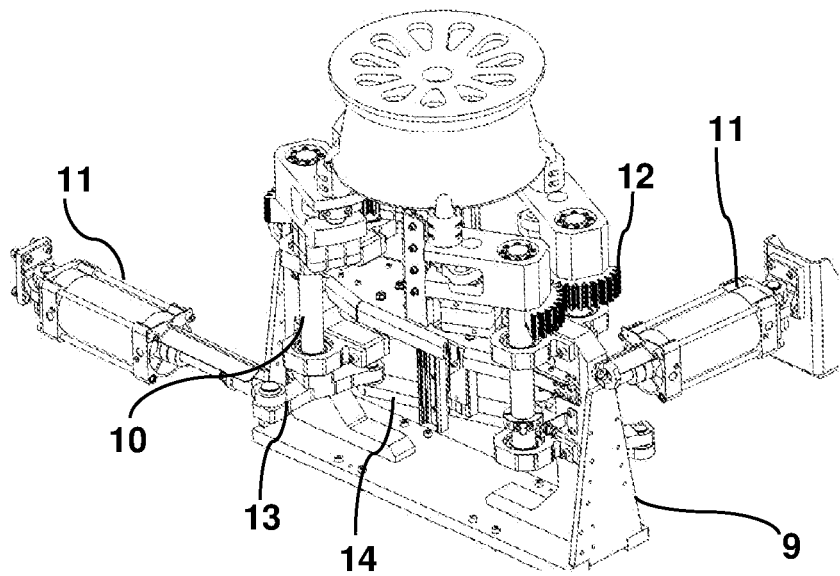
FIG. 2 is another perspective view of a clamping device together with a rim.

FIG. 1 shows a perspective view of a clamping device together with a clamped rim, and FIG. 2 shows a further perspective view of a clamping device together with a rim. The clamping device 1 can be part of a tire mounting line (not shown), in which the rim 2 is conveyed, with the aid of a transporting device (likewise not shown), to the clamping device 1, in which the rim 2 is held so that the tire can be fitted. For this purpose, the rim 2 has to be securely clamped by the clamping device 1 in a defined position so that the tire can be fitted successfully.

The clamping device 1 comprises four clamping elements 3, each of which has a main body 4 which, at its free end, has a receptacle for a clamping arm 5 that is mounted such that it can freely rotate in the main body 4. The rim 2 rests on support surfaces 6 which are formed by support elements 7. The rim 2 is clamped by the clamping fingers 8 which protrude beyond the support surfaces 6 and are provided at the end of the clamping arms 5. The clamping arms 5 clamp the rim advantageously at a distance of 45° from one another.

The main bodies 4 can be fastened to a frame 9, which may be part of the tire mounting line or can be easily integrated into it. At their ends opposite the free ends, the main bodies 4 have openings in which shafts 10 are mounted, which shafts are connected to the main bodies for conjoint rotation and are operatively connected to a drive arranged below the clamping elements 3. In the example shown, there are two drives that are designed as pneumatically or hydraulically actuable lifting cylinders. Alternatively, an electric motor drive can be used.

Furthermore, a gear wheel drive is provided in which a gear wheel 12 is arranged on a clamping element 3 or its shaft 10 in such a way that the gear wheels 12 of two adjacent clamping elements 3 are brought into engagement with one another, such that movements of two clamping elements 3 can be synchronized with one another. The interlocking clamping elements 3 are moved via the corresponding drive 11, which acts on the shafts 10 of the clamping elements 3 via a lever 13 or gear rods and causes a rotational movement of the shafts 10 and consequently a circular-arc-shaped movement of the interlocking clamping elements 3. The movement of the clamping elements 3 takes place in the shape of a circular arc in a plane which is substantially perpendicular to the longitudinal axis of the rim 2 placed on the support surfaces 6.

In one embodiment, the clamping device 1 thus comprises four clamping elements 3, each of which are combined in pairs of clamping elements 3 that have synchronized movements, the pairs of clamping elements 3 being substantially opposite one another. More than four clamping elements can also be provided.

As can be seen in FIG. 2, the movements of the two pairs of clamping elements 3 are synchronized by a lever mechanism (not shown in more detail) via a coupling rod 14 which is arranged below the clamping elements 3 and acts on the levers 13 that are non-rotatably connected to the shaft 10. The force required to move the clamping elements 3, which are synchronized with one another via the coupling rod 14, is provided via the drives 11. In this way, all four clamping elements 3 are moved synchronously, in particular in a circular-arc shape. Before the rim 2 is placed on the support surfaces 6, the clamping elements 3 are moved synchronously into position such that the rim flange can be placed on all four support surfaces 6.

Figure 3:
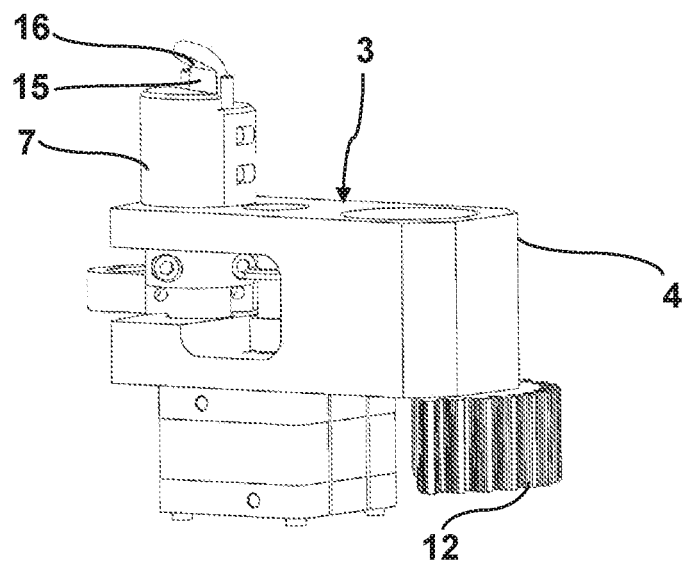
FIG. 3 is an enlarged view of a clamping element.
Figure 4:
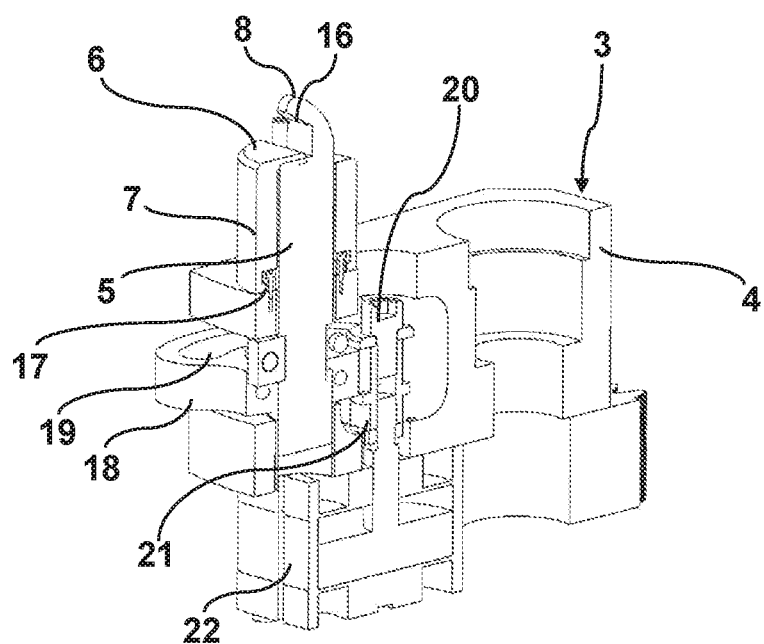
FIG. 4 is a sectional view of a clamping element.
Figure 5:
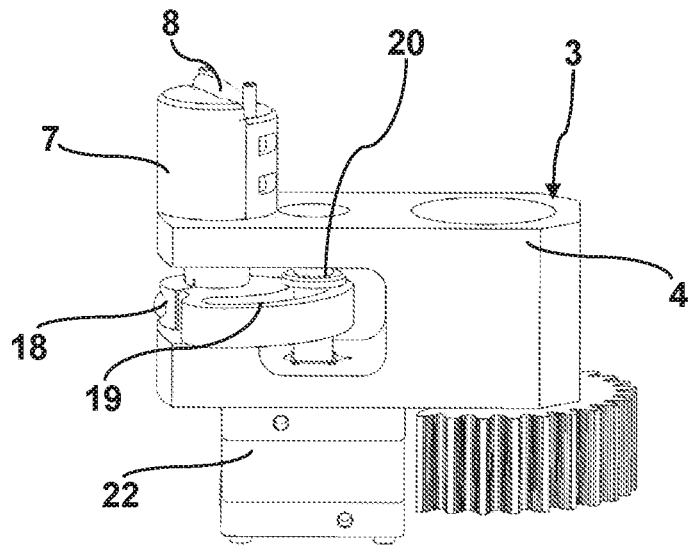
FIG. 5 shows an embodiment in which the clamping arm is retracted.

FIG. 3 shows an enlarged view of a clamping element, FIG. 4 shows a sectional view of a clamping element and FIG. 5 shows an embodiment in which the clamping arm is retracted. In the following, embodiments are explained using one clamping arm, this being applicable to all clamping arms.

Each main body 4 of the clamping elements 3 is penetrated at its free end by the clamping arm 5, the clamping finger 8 of which protrudes beyond the support surface 6 formed by the support element 7. The clamping finger 8 has a flat, substantially vertical first clamping region 15 oriented towards the support surface 6 and a second clamping region 16 which is inclined with respect to the first clamping region 15 and is wedge-shaped. Depending on the size of the rim, both clamping regions 15, 16 or only the second clamping region 16 can come into contact with the rim flange of a rim 2. However, the clamping force necessary for clamping the rim is introduced into the rim flange via the second clamping region 16, which forms the clamping surface.

The clamping surface can be coated with a friction-reducing layer. In the example shown, the first clamping region 15 and the second clamping region 16 are substantially flat. However, it may also be advantageous for the first clamping region 15, the second clamping region 16 or both clamping regions 15, 16 to be concave. The top and back of the clamping arm 5 or of the clamping finger 8 can be rounded and smooth so that there is a minimal interfering contour and the tire can move out of the way in an unimpeded manner during mounting and is not damaged. The clamping arm 5 can be cylindrical or polygonal.

The clamping arm 5 is surrounded by the cylindrical support element 7, which is formed in two parts, a rear part of the support element 7 being placed on the back and a front part of the support element 7 being placed on the front of the clamping arm 5. The two parts can have different heights and can be connected to one another and to the main body 4 by means of screws. A circumferential groove 17 is provided in the support element 7, into which groove heads of fastening means, such as screws, engage and axially secure the support element 7. The tops of both parts form surfaces, the surface of the front part forming the support surface 6 for the rim flange. However, the tops of both parts may preferably also form support surfaces. In the support element 7, adjacent to the clamping finger 8, two pins are arranged which can be helpful for roughly aligning the clamping arm 5.

In one embodiment, the clamping arm 5 or the clamping arm 5 and the support element 7 may be rotatable about their longitudinal axes. This can be used to align the clamping arm 5 and optionally the support surface 6. The rotation can, for example, be carried out manually or via an electric motor drive. For the embodiment in which only the clamping arm 5 is rotatable, it may be advantageous if the top of the support element is entirely in the form of a support surface. As a result, the clamping finger 8 always protrudes beyond a support surface 6 even after rotation. The rotation of the clamping arm 5 or of the support element 7 can be prevented by means of securing means which engage, for example in the form of a bolt, in a groove-shaped recess in the clamping arm 5, or correspondingly in the support element 7, and lock the clamping arm 5 or the support element 7 in their position, removal of the bolt allowing rotation again. The rotation and locking of the clamping arm 5 or of the support element 7 can be carried out manually or automatically.

Furthermore, as indicated in FIG. 4, the clamping arm 5 may be designed to be retractable and can be moved vertically. This allows the clamping surface formed by the second clamping region 16 to be brought into contact with the rim flange if the diameter of the rim flange resting on the support surface 6 is too small and the rim flange does not come into contact with the second clamping region 16, i.e. the clamping surface. The clamping arm 5 can be retractable substantially up to the transition from the first clamping region 15 to the second clamping region 16, such that the distance between the support surface 6 and the clamping surface, i.e. the second clamping region 16, is reduced. Of course, the opposite configuration is also possible, in which the distance between the support surface 6 and the second clamping region 16 has to be increased since the diameter of the rim flange resting on the support surface 6 is too large.

To carry out the vertical movement, the clamping arm 5 is connected, for conjoint rotation, to a clamping element 18 which has an arcuate slot 19 into which a bolt 20 of a pulling device 21 engages. The pulling device is operatively connected to a lifting cylinder arranged below the clamping element 3, such that an upward or downward stroke of the lifting cylinder causes an upward or downward movement of the clamping arm 5. A pneumatic cylinder or hydraulic cylinder, for example, can be used as the lifting cylinder. Alternatively, an electric motor drive can also be used. FIG. 5 shows an embodiment in which the clamping arm 5 is retracted and has been moved vertically by the lifting cylinder 22.

In order to clamp a rim 2, said rim is conveyed by a transporting device to the clamping device 1, the clamping device 1, which is connected, for example, to a computer unit, positioning the clamping elements 3 on the basis of the rim size in such a way that the rim flange of the rim can be placed on the support surface 6. The rim flange can then be clamped in such a way that clamping elements 3 synchronously move the clamping surfaces into contact with the rim flange and said flange is clamped by turning in the clamping elements 3 or the clamping arms 5. Alternatively, the rim flange placed on the support surfaces 6 can be brought into contact with the second clamping region, i.e. the clamping surface, by a vertical movement of the clamping arms 5 or of the support surface 6, and the rim can be clamped by the planar clamping force introduced into the rim flange via the second clamping regions.

Figure 6:
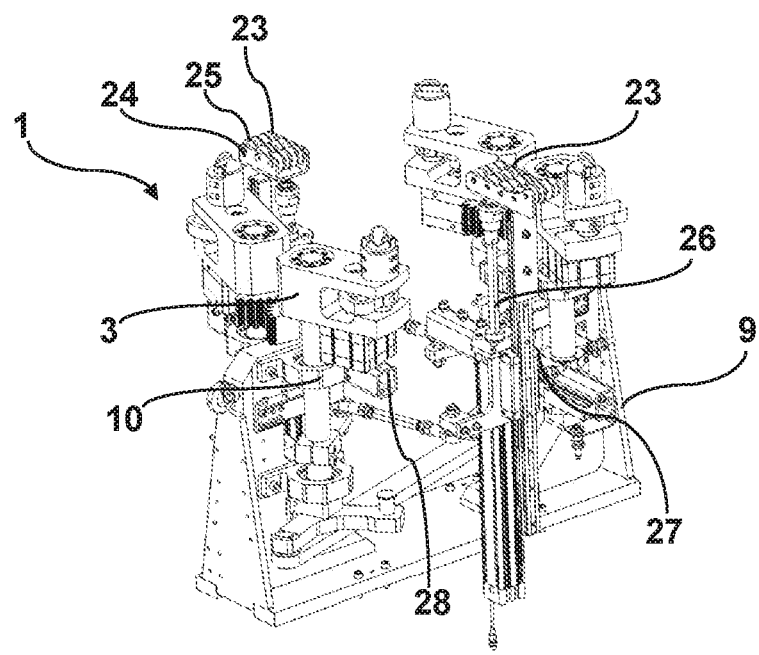
FIG. 6 is a perspective view of a clamping device comprising tire levers.
Figure 7:
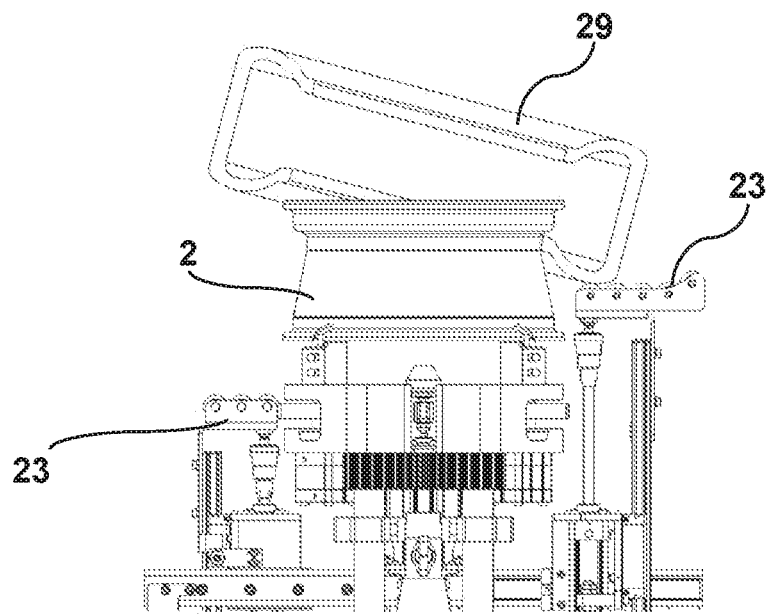
FIG. 7 is a side view of a clamping device with tire levers, rim, and tire.

FIG. 6 is a perspective view of a clamping device comprising tire levers and FIG. 7 is a side view of a clamping device with tire levers, rim, and tire. The clamping device 1 can comprise two tire levers 23, each of which consists of rollers 25 which are arranged one behind the other in a cage 24 and are height-adjustably arranged on the clamping device 1 with the aid of a lifting device 26. In the embodiment, two opposite tire levers 23 are shown. However, fewer or more tire levers 23 can also be used. The tire levers 23 can be slid on a linear guide 27 held on the frame 9. The two tire levers 23 are located on a radius that is suitable for the mounted tire. The tire levers 23 are connected to the shaft 10 of the clamping elements 3 via a lever mechanism such that a movement of the clamping elements 3 also causes a linear movement of the tire levers 23 on the linear guide. In this way it can be ensured that the tire levers 23 are located on a radius that is suited to the tire of the clamped rim size. The reason for this is that the tire bead diameter always matches the rim size.

FIG. 7 indicates how the tyre levers 23 facilitate the mounting of the tire 29 on the rim 2 by correctly positioning or pressing the tire 29. In the example shown, the tire lever 23 has raised the lower bead of the tire 29 so that said bead can be pushed into the drop center of the rim 2 by the tire pusher (not shown). Further tire mounting tools are part of the tire mounting process, but are not shown in the figures. If necessary, the clamping device can be supplemented by further mounting tools, the movement of which can also be synchronized with the movement of the clamping elements.

Figure 8:
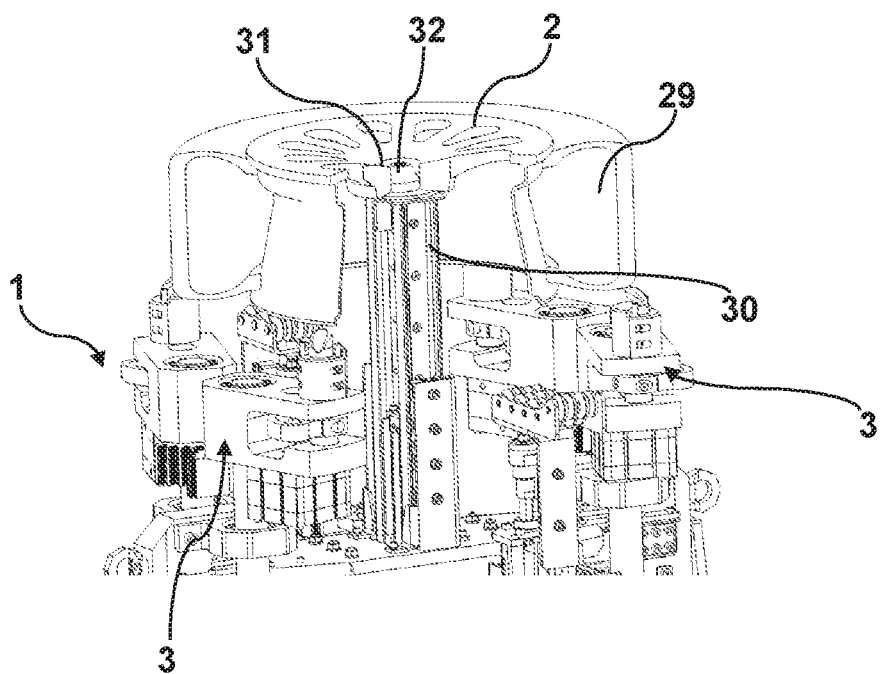
FIG. 8 shows a clamping device comprising a rim holder.

FIG. 8 shows an embodiment of the clamping device comprising a rim holder. A height-adjustable rim holder 30 can be arranged substantially in the center of the clamping device 1. After the tire 29 has been fitted onto the rim 2 and before the clamping elements 3 release the rim 2 and move apart, the height-adjustable rim holder 30 engages, by means of its receiving body 31 which is arranged on the end, the central bore 32 of the rim 2 and secures it radially. This prevents the mounted wheel from being moved out of its position by the clamping elements 3 moving apart, by the clamping elements 3 catching on the tire 29 when moving. The receiving body 32 can be moved vertically with the aid of rails which, for example, can be moved by an electric motor or pneumatically.

Finally, it should be noted that the above embodiments were explained using one clamping element by way of example, but can be transferred to all clamping elements and their components.

What is claimed is:

1. A device for clamping a rim of a vehicle wheel, comprising at least four clamping elements which can be moved with respect to the rim and comprise clamping arms and support elements having support surfaces on which a rim flange of the rim can be placed, wherein the clamping arms are rotatably mounted, about their longitudinal axis, in the clamping elements, and have clamping fingers at the end that protrude beyond the support surfaces, which fingers have clamping surfaces which can be brought into clamping contact with the placeable rim flange, wherein each clamping element is connected to only one adjacently arranged clamping element via gear wheels so as to transmit movement, such that each respective adjacently arranged clamping elements can be moved synchronously with one another.

2. The device according to claim 1, wherein the clamping fingers have a first vertical clamping region and a second clamping region which is adjacent thereto and forms the clamping surface, the second region being inclined with respect to the first region.

3. The device according to claim 1, wherein the angle of inclination between the first clamping region and the second clamping region is more than 90°.

4. The device according to claim 1, wherein the clamping arms or the support elements are vertically movable such that the distance between the clamping surface and the support surface can be changed.

5. The device according to claim 4, wherein a lifting cylinder is provided in each case on the clamping element so as to be brought into operative contact with a clamping arm or a support element, and the clamping arm or the support element is vertically movable by a downward and upward stroke of the lifting cylinder.

6. The device according to claim 2, wherein the first and/or second clamping region of the clamping fingers are or is flat or concave.

7. The device according to claim 1, wherein the clamping elements have shafts which penetrate said elements and are connected to a drive arranged below the clamping elements such that the clamping elements can be moved in a circular arc in a plane perpendicular to the longitudinal axis of the placeable rim.

8. The device according to claim 1, wherein the movement of two clamping elements that are operatively connected via gear wheels is synchronized, via a coupling rod that is connected to the drive and acts on the shafts of the clamping elements, with the movement of opposite clamping elements that are operatively connected via gear wheels.

9. The device according to claim 1, wherein the support elements are rotatably mounted, about their longitudinal axis, in the clamping elements.

10. The device according to claim 1, wherein the clamping device has at least two tire levers which are connected to the clamping elements via a lever mechanism such that a movement of the clamping elements causes a linear movement of the tire levers.

11. The device according to claim 1, wherein the clamping device has a vertically movable rim holder which can be brought into contact with a central hole in the rim.

* * * * *